(12) United States Patent
Oh

(10) Patent No.: US 8,954,172 B2
(45) Date of Patent: Feb. 10, 2015

(54) METHOD AND APPARATUS TO PROCESS AN AUDIO USER INTERFACE AND AUDIO DEVICE USING THE SAME

(75) Inventor: Yoon-hark Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1675 days.

(21) Appl. No.: 11/735,566

(22) Filed: Apr. 16, 2007

(65) Prior Publication Data

US 2008/0133035 A1    Jun. 5, 2008

(30) Foreign Application Priority Data

Dec. 5, 2006    (KR) .................. 10-2006-0122582

(51) Int. Cl.
*G06F 17/00* (2006.01)
*G08B 3/10* (2006.01)
*G10H 7/00* (2006.01)
*G06F 17/30* (2006.01)

(52) U.S. Cl.
CPC .............................. *G06F 17/30752* (2013.01)
USPC .................... 700/94; 340/384.5; 84/604

(58) Field of Classification Search
USPC ............... 700/94; 715/727; 340/384.4, 384.7, 340/825.24, 825.25; 707/741, 812; 360/12; 84/601–604
See application file for complete search history.

(56) References Cited

U.S. PATENT DOCUMENTS

| 5,428,388 | A | * | 6/1995 | von Bauer et al. ............ 348/155 |
| 6,114,978 | A | | 9/2000 | Hoag |
| 2002/0137012 | A1 | | 9/2002 | Hohl |
| 2004/0044804 | A1 | * | 3/2004 | MacFarlane ..................... 710/1 |
| 2004/0069121 | A1 | * | 4/2004 | Georges ........................ 84/609 |
| 2004/0138770 | A1 | * | 7/2004 | Hanabusa et al. ............. 700/94 |
| 2005/0278764 | A1 | * | 12/2005 | Barr ............................. 725/100 |
| 2006/0038663 | A1 | * | 2/2006 | Steinetz et al. ............ 340/392.1 |
| 2006/0074649 | A1 | * | 4/2006 | Pachet et al. ................. 704/229 |
| 2007/0191978 | A1 | * | 8/2007 | Chung ........................... 700/94 |
| 2008/0013757 | A1 | * | 1/2008 | Carrier ......................... 381/119 |

FOREIGN PATENT DOCUMENTS

| EP | 877378 | 11/1998 |
| EP | 1677531 | 7/2006 |
| KR | 2006-65270 | 6/2006 |

OTHER PUBLICATIONS

360 Systems, "Instant Replay Owner's Manual", Jan. 1997, 360 Systems, Fifth Edition, all pages.*
Boss, "RC-50 Loop Station Owner's Manual", 2005, Boss, pp. 6-13, 20-23, 27-33, 47-55, 80-81.*

(Continued)

*Primary Examiner* — Jesse Elbin
(74) *Attorney, Agent, or Firm* — Staas & Halsey LLP

(57) ABSTRACT

A method and apparatus to process a user-defined audio user interface (UI), and an audio device using the same. The method includes designating a specific portion of an audio signal being reproduced, using a specific input member, capturing audio data of the designated specific portion, mapping the captured audio data of the designated specific portion to information on the specific input member, and constructing an audio UI database using the audio data of the designated specific portion mapped to the information on the specific input member. Accordingly, by constructing an audio UI database by selecting sounds preferred by a user, demands of various users, which cannot be provided by existing MP3 players, can be satisfied.

17 Claims, 3 Drawing Sheets

| UP | USER-DEFINED FIRST AUDIO DATA |
| DOWM | USER-DEFINED SECOND AUDIO DATA |
| LEFT | USER-DEFINED THIRD AUDIO DATA |
| RIGHT | USER-DEFINED FOURTH AUDIO DATA |
| . . . | . . . |

(56) References Cited

OTHER PUBLICATIONS

Blum, Marcel, "Soundplant", Feb. 2006, www.soundplant.org, version 26.1, all pages.*

Blum, Marcel, "Soundplant 26.1 readme file", Sep. 22, 2002, all pages.*

European Search Report dated Jul. 27, 2007 issued in EP 07107399.

Korean Office Action dated Sep. 10, 2012 issued in KR Application No. 10-2006-0122582.

Office Action issued in KR Application No. 10-2006-0122582 dated Mar. 27, 2013.

* cited by examiner

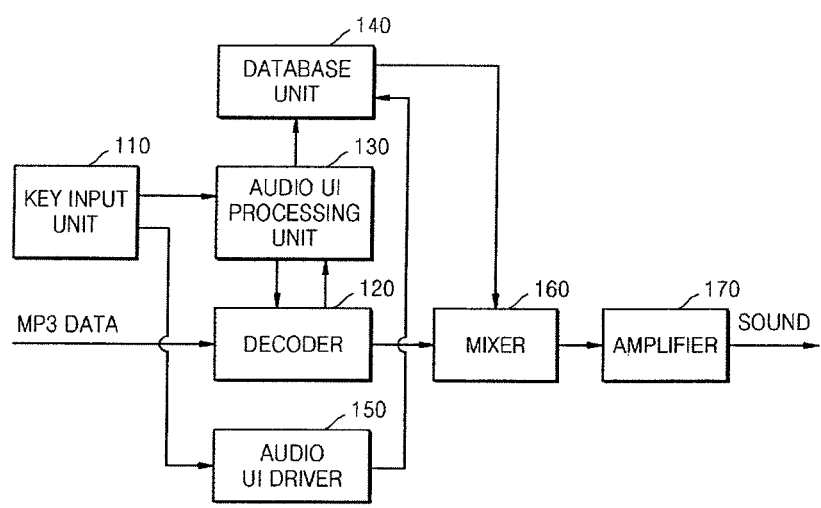

METHOD AND APPARATUS TO PROCESS AN AUDIO USER INTERFACE AND AUDIO DEVICE USING THE SAME

CROSS-REFERENCE TO RELATED APPLICATIONS

This application claims priority under Korean Patent Application No. 10-2006-0122582, filed on Dec. 5, 2006, in the Korean Intellectual Property Office, the disclosure of which is incorporated herein in its entirety by reference.

BACKGROUND OF THE INVENTION

1. Field of the Invention

The present general inventive concept relates to an audio signal processing system, and more particularly, to a method and apparatus to process a user-defined audio user interface (UI), and an audio device using the same.

2. Description of the Related Art

Conventional user interface (UI) technology provides sound feedback according to a user's selected state, and allows the user to view the state selected by the user on a display unit.

A conventional audio UI processing apparatus can include a key input unit, a signal processing processor, and an audio UI database.

The audio UI database is constructed to include a plurality of sounds (e.g., audio files) designated by a developer. The key input unit receives key information input by the user and transmits the key information to the signal processing processor. The signal processing processor receives the key information, reads an audio UI sound mapped to the key information from the audio UI database, and reproduces the read audio UI sound.

In the conventional UI technology, a database is constructed to include a plurality of sounds designated by a UI developer. Thus, even though the UI developer develops enhanced audio UI sounds suitable during a recent trend (e.g., sounds generally desired by a population), demands of various preferred sounds according to various individual user groups cannot be satisfied. For example, sounds preferred by teenage women or women in their twenties are definitely different from sounds preferred by men in their forties. Thus, users usually disable an audio UI function upon hearing undesirable audio UI sounds. In addition, since the existing UI technology uses a beep or a buzzer, the conventional UI technology has insufficient sensitive facts and is weak at conveyance of information due to simple feedback.

SUMMARY OF THE INVENTION

The present general inventive concept provides a method and apparatus to process an audio user interface (UI), whereby a plurality of users can construct and update an audio UI database by directly selecting preferred sounds.

The present general inventive concept also provides an audio device using the audio UI processing method and apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of processing an audio UI, the method including designating a specific portion of an audio signal being reproduced, using a specific input member, capturing audio data of the designated specific portion, and constructing an audio UI database by mapping the captured audio data of the designated specific portion to information corresponding to the specific input member.

The foregoing and/or other aspects and utilities of the present general inventive concept may also be achieved by providing an apparatus to process an audio UI, the apparatus including an input member to generate information corresponding to a selected key, and an audio UI processing unit to select a specific duration of audio data being reproduced if pre-set key information is received from the input member and to construct an audio UI database by mapping the specific duration of audio data to the key information of the input member.

The foregoing and/or other aspects and utilities of the present general inventive concept may also be achieved by providing an audio device including an input member to generate information corresponding to a selected key, an audio UI processing unit to select a specific duration of audio data being reproduced if pre-set key information is received from the input member and to construct an audio UI database by mapping the specific duration of audio data to the key information of the input member, an audio UI driver to read audio data mapped to key information from the audio UI database if the key information is received from the input member, a mixer to mix and output the audio data read by the audio UI driver and audio data output from a decoder, and an amplifier to amplify the audio data output from the mixer.

The foregoing and/or other aspects and utilities of the present general inventive concept may also be achieved by providing an audio device, including a key input unit to allow a user to input a key to generate a specific duration of an audio file, and an audio User Interface (UI) unit to map the specific duration of the audio file to another key in the key input unit.

The audio device may further include a database unit to store the mapped audio file.

The specific duration of the audio file may be input by the user when the user presses the key down and holds the key in the pressed-down position during a desired time period.

The specific duration of the audio file corresponds to a time period between a first instant the key is pressed by the user and a second instant the key is pressed by the user.

The key input unit includes a menu key to choose between a plurality of menu options, a navigation key to select the audio file, and an audio file duration selection key to specify a desired length of the audio file.

The foregoing and/or other aspects and utilities of the present general inventive concept may also be achieved by providing a method of processing an audio User Interface (UI), the method including inputting a key to specify a duration of an audio file, mapping the specific duration of the audio file to another key, and storing the mapped audio file.

The specifying of the duration of the audio files may further include pressing and holding the key during a desired time period.

The specifying of the duration of the audio files may further include pressing the key once at a beginning of a desired time period, and pressing the key once again at an end of a desired time period.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1 is a block diagram of an audio device using an audio user interface (UI) according to an embodiment of the present general inventive concept;

FIG. 2 is an audio UI database constructed in a database unit illustrated in FIG. 1, according to an embodiment of the present general inventive concept;

DETAILED DESCRIPTION OF THE PREFERRED EMBODIMENTS

Figure 3:
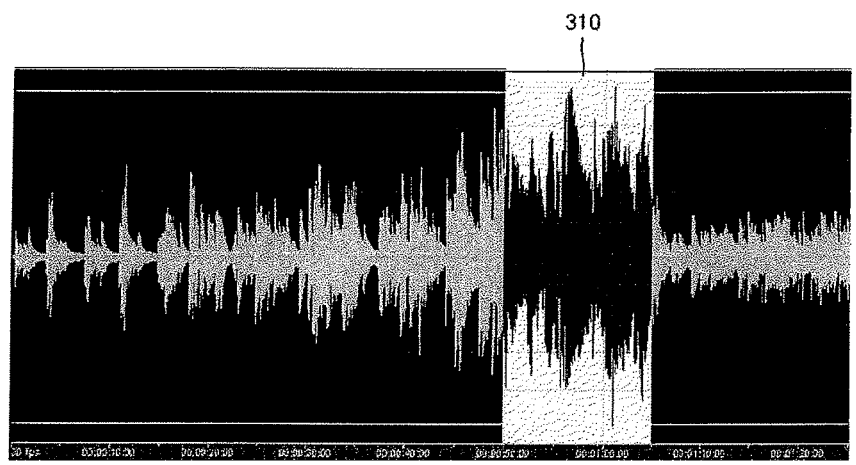
FIG. 3 is a waveform diagram illustrating a specific duration of an audio signal captured by an audio UI processing unit illustrated in FIG. 1, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an audio device using an audio user interface (UI) according to an embodiment of the present general inventive concept.

A key input unit 110 generates information corresponding to a key selected by a user. For example, the key input unit 110 can include a navigation key, which includes an up key, a down key, a left key, a right key, a menu key, a select key, etc., an audio UI duration selection key (e.g., an audio file duration selection key), and other keys not mentioned.

A decoder 120 decodes MP3 compressed data, which is selected by the user to original audio data.

An audio UI processing unit 130 pre-sets a menu or a key corresponding to an audio UI, selects a specific duration of the audio data decoded by the decoder 120 if pre-set key information and audio UI duration selection key information are received from the key input unit 110, maps the selected specific duration of the audio data to the audio UI duration selection key information, and outputs the mapped selected specific duration data to a database unit 140.

The database unit 140 is assigned in a specific memory area of the audio device and stores specific durations of audio data mapped according to keys by the audio UI processing unit 130 as new audio UI sounds. Pre-stored audio UI sounds can be updated to audio UI sounds selected by the audio UI processing unit 130.

If navigation key information is received from the key input unit 110, an audio UI driver 150 reads audio data mapped to the navigation key information from the database unit 140.

A mixer 160 passes MP3 data which is input from the decoder 120, or an audio UI sound which is input from the database unit 140, which can be reproduced in a music play mode or an audio UI mode, without mixing. However, when the music play mode and the audio UI mode are simultaneously activated, the mixer 160 mixes MP3 data which is input from the decoder 120 and an audio UI sound which is input from the database unit 140.

An amplifier 170 converts audio data which is input from the mixer 160 to an analog audio signal, amplifies the analog audio signal, and outputs the amplified analog audio signal to earphones or speakers.

FIG. 2 is an audio UI database constructed in the database unit 140 illustrated in FIG. 1, according to an embodiment of the present general inventive concept.

Referring to FIG. 2, user-defined first, second, third, and fourth audio data which is mapped to up, down, left, and right keys, respectively, is sequentially stored.

FIG. 3 is a waveform diagram illustrating a specific duration of an audio signal captured by the audio UI processing unit 130 illustrated in FIG. 1, according to an embodiment of the present general inventive concept.

Referring to FIG. 3, when a specific key is pushed, the audio UI processing unit 130 captures a specific duration 310 of an audio signal corresponding to a predetermined time period.

Figure 4:
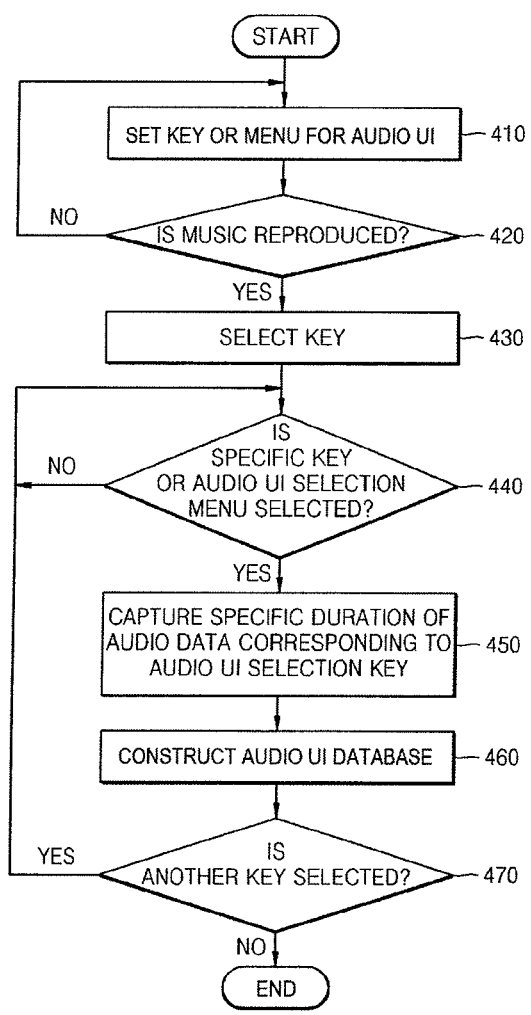
FIG. 4 is a flowchart of a method of processing an audio UI according to an embodiment of the present general inventive concept.

FIG. 4 is a flowchart of a method of processing an audio UI according to an embodiment of the present general inventive concept.

Referring to FIG. 4, an audio UI menu is separately designated, and a separate specific key or audio UI duration selection menu corresponding to an audio UI is set in operation 410.

A pre-set audio UI generation menu is selected.

It is determined in operation 420 whether an audio signal selected by a user is being reproduced.

If it is determined in operation 420 that music is being reproduced, a selection signal of a key is input by the user in a specific portion of the audio signal being reproduced in operation 430. For example, if an "up" key of a navigation key is selected, information corresponding to the "up" key is received.

It is determined in operation 440 whether a specific key or an audio UI duration selection menu, which is pre-set according to an audio UI duration, is selected. For example, in order to select the audio UI duration, an audio UI duration key can be defined by a manufacturer as an exclusive key or a menu to start and end the audio UI duration. Thus, for example, a method of designating a desired duration may include a press and hold method of pressing a separate specific key or audio UI duration selection menu during the desired duration, or a method of pressing a separate specific key or audio UI duration selection menu at the beginning of the desired duration and pressing it again at the end of the desired duration.

If the audio UI duration selection key is selected, a specific duration of the audio data being reproduced corresponding to the selected duration is captured in operation 450. The captured specific duration can be selected on a buffering basis or predetermined time basis by a corresponding specific key or menu.

The captured specific duration of the audio data is mapped to information on the audio UI duration selection key and stored in an audio UI database assigned in a separate memory area. Thus, the audio UI database includes data obtained by respectively mapping specific durations of audio data to audio UI duration selection key information in operation 460.

In addition, an existing audio UI sound can be updated to a specific portion of audio data selected by the user by means of a key input.

Various methods may be used to store a specific duration of audio data in the audio UI database.

For example, a first method may be a method of storing Pulse Code Modulation (PCM) data obtained by decoding a plurality of music files (e.g., MP3 files), which are preferred by the user, in the audio UI database. The first method has an advantage that almost no delay time exists between a time when the key is input to a time when the audio UI sound is output.

Another method may be a method of encoding a desired portion of PCM data obtained by decoding a plurality of music files (e.g., MP3 files), which are preferred by the user, and storing the encoded portion in the audio UI database. This method has an advantage that only a small amount of memory space of the audio UI database is needed.

Yet another method may be a method of storing only information corresponding to start time and an end time of a desired portion of each music file, which is preferred by the user, in the audio UI database, and storing the preferred music files in a specific memory area which cannot erased by the user. Since this method stores only the information corresponding to the start time and the end time, only a small amount of memory space of the audio UI database is needed.

In operation 470 of FIG. 4, it is determined whether another audio UI duration selection key of the navigation key is selected. If it is determined that another audio UI duration selection key is selected, operations 440 to 460 are repeated to construct the audio UI database or update an audio UI sound in the audio UI database.

Thus, the database illustrated in FIG. 2 is constructed by designating each audio UI sound using a navigation key, a menu key, and a selection key. In addition, an exclusive audio UI sound which the user desires can be designated with respect to the navigation key (i.e., up, down, left, and right), the selection key, and the menu key.

The present general inventive concept is not limited to the embodiments described above, and it can be understood by those skilled in the art that various changes in form and detail may be made therein without departing from the spirit and scope of the general inventive concept.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves and signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, by constructing an audio UI database by selecting sounds preferred by a user, demands of various users, which cannot be provided by existing MP3 players, can be satisfied.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of processing an audio User Interface (UI), the method comprising:
    designating a specific duration of an audio signal being reproduced;
    capturing the designated specific duration of the audio signal;
    selecting a key among one or more keys of a key input unit;
    mapping the captured specific duration of the audio signal to audio UI sound corresponding to the selected key and storing the mapped audio UI sound in an audio UI database; and
    reading and outputting the mapped audio UI sound from the audio UI database to provide audio UI sound feedback when an input from the selected key is received,
    wherein the capturing of the audio signal comprises selecting the specific duration of the audio signal corresponding to a predetermined time period.

2. The method of claim 1, wherein the specific duration of the audio signal is designated by a user.

3. The method of claim 1, wherein the capturing of the audio signal comprises:
    selecting the audio signal of the designated specific duration corresponding to a predetermined time period using a pre-set audio duration selection key.

4. The method of claim 1, wherein the designating of the specific duration of the audio signal comprises:
    pressing a different key or an audio duration selection menu at a beginning of a desired audio duration and pressing the different key or the audio duration selection menu again at the end of the desired audio duration.

5. The method of claim 1, wherein the designation of the specific portion of the audio signal includes designating a start time of the specific portion of the audio signal and an end time of the specific portion of the audio signal.

6. The method of claim 1, wherein the designating of the specific portion of the audio signal comprises:
    pressing and holding a different key or an audio duration selection menu in a pressed-down position at a beginning of a desired audio duration and releasing the different key or the audio duration selection menu from the pressed-down position at an end of the desired audio duration.

7. The method of claim 1, wherein the specific input member is one of a plurality of keys or is one of a plurality of buttons of a cellular phone.

8. The method of claim 1, further comprising:
    constructing the audio UI database using the audio signal of the designated specific duration mapped to the corresponding key input unit.

9. The method of claim 8, wherein the constructing of the audio UI database comprises:
    mapping the captured audio signal of the designated specific duration to audio duration selection key information; and
    copying the mapped key information and audio data of the designated specific duration in a predetermined memory area.

10. The method of claim 8, wherein the constructing of the audio UI database comprises:
    storing a specific portion of decoded Pulse Code Modulation (PCM) data in the audio UI database.

11. The method of claim 8, wherein the constructing of the audio UI database comprises encoding a specific portion of decoded PCM data and storing the encoded specific portion in the audio UI database.

12. The method of claim 8, wherein the constructing of the audio UI database comprises:
    storing information on start time and end time of selected PCM data; and
    storing the selected PCM data in a specific memory area.

13. The method of claim 8, further comprising:
updating an audio UI sound pre-stored in the audio UI database to the captured audio data of the designated specific duration.

14. An apparatus to process an audio User Interface (UI), the apparatus comprising:
an input member to generate key information corresponding to a selected key; and
an audio UI processing unit to designate a specific duration of audio data being reproduced if pre-set key information corresponding to a different selected key is received from the input member and to construct an audio database by mapping the specific duration of the audio data to audio UI sound corresponding to the selected key of the input member so that audio UI sound feedback corresponding to the selected key is outputted when an input from the selected key is received,
wherein the specific duration of the audio signal corresponds to a predetermined time period.

15. The apparatus of claim 14, further comprising:
a database to store a specific audio duration defined by a user and audio UI information mapped to the key information.

16. The apparatus of claim 14, further comprising:
a decoder to decode compressed audio data to audio data.

17. The apparatus of claim 14, wherein selected the key may be one of any key available on the apparatus.

\* \* \* \* \*